United States Patent

Shum et al.

(10) Patent No.: US 10,108,710 B2
(45) Date of Patent: Oct. 23, 2018

(54) MULTIDIMENSIONAL SEARCH ARCHITECTURE

(71) Applicant: Microsoft Corporation, Redmond, WA (US)

(72) Inventors: Heung Yeung Shum, Medina, WA (US); Derrick Leslie Connell, Bellevue, WA (US); Xavier Legros, Woodside, CA (US); Kevin L. Haas, Los Gatos, CA (US); Kang Li, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 921 days.

(21) Appl. No.: 13/674,926

(22) Filed: Nov. 12, 2012

(65) Prior Publication Data

US 2014/0136504 A1 May 15, 2014

(51) Int. Cl.
*G06F 7/02* (2006.01)
*G06F 17/30* (2006.01)

(52) U.S. Cl.
CPC .. *G06F 17/30864* (2013.01); *G06F 17/30011* (2013.01); *G06F 17/30554* (2013.01); *G06F 17/30598* (2013.01)

(58) Field of Classification Search
CPC ......... G06F 17/30011; G06F 17/30864; G06F 17/30598; G06F 17/30554; G06F 17/30
See application file for complete search history.

(56) References Cited

U.S. PATENT DOCUMENTS

| 7,308,457 B1 | 12/2007 | Sundman et al. |
| 7,890,501 B2 | 2/2011 | Lunt et al. |
| 8,005,906 B2 | 8/2011 | Hayashi et al. |

(Continued)

OTHER PUBLICATIONS

Sterling, Greg., "Snapshot, Sidebar Oh My: Live Blogging the Bing Search Summit", Retrieved at <<http://searchengineland.com/live-blogging-the-bing-search-summit-2-120874>>, May 10, 2012, pp. 7.

(Continued)

*Primary Examiner* — Bruce M Moser
(74) *Attorney, Agent, or Firm* — The Watson I.P. Group, PLC; Vladan M. Vasiljevic

(57) ABSTRACT

Search results can include, not only responsive content, typically in the form of documents, but can also include information regarding responsive entities, including tasks relevant to those entities, and can include identifications of individuals from whom additional information can be obtained, or who are otherwise relevant to the search. An association between entities and documents referencing those entities is identified and maintained. Documents responsive to a user's search query are identified utilizing existing algorithmic mechanisms and such identified responsive documents are referenced to determine whether they are associated with one or more entities. Additionally, a people/query mapping is maintained associating individual people with specific queries. User actions directed to one or more people in response to a query are utilized as a feedback loop. User actions directed to one dimension of search results can be utilized to generate updated search queries providing updated search results in other dimensions.

5 Claims, 5 Drawing Sheets

(56) References Cited

U.S. PATENT DOCUMENTS

| | | |
|---|---|---|
| 8,019,743 B2 | 9/2011 | Ebanks |
| 8,121,900 B1 | 2/2012 | Gulten et al. |
| 8,131,779 B2 | 3/2012 | Jonker et al. |
| 8,799,276 B1 | 8/2014 | Hyatt et al. |
| 2006/0064410 A1 | 3/2006 | Razza et al. |
| 2006/0173702 A1 | 8/2006 | Saxena et al. |
| 2007/0005702 A1 | 1/2007 | Tokuda et al. |
| 2007/0271272 A1 | 11/2007 | McGuire et al. |
| 2008/0133495 A1 | 6/2008 | Fischer |
| 2009/0030940 A1 | 1/2009 | Brezina et al. |
| 2009/0164913 A1 | 6/2009 | Davar et al. |
| 2009/0164929 A1 | 6/2009 | Chen et al. |
| 2009/0187537 A1 | 7/2009 | Yachin et al. |
| 2009/0234814 A1 | 9/2009 | Boerries et al. |
| 2009/0249244 A1 | 10/2009 | Robinson et al. |
| 2009/0282002 A1 | 11/2009 | Reeder et al. |
| 2009/0307205 A1 | 12/2009 | Churchill et al. |
| 2010/0115396 A1 | 5/2010 | Byron et al. |
| 2010/0153215 A1 | 6/2010 | Abraham |
| 2010/0174704 A1 | 7/2010 | Ciravegna et al. |
| 2011/0055207 A1* | 3/2011 | Schorzman ....... G06F 17/30699 707/723 |
| 2011/0208822 A1 | 8/2011 | Rathod |
| 2011/0320423 A1 | 12/2011 | Gemmell et al. |
| 2012/0005201 A1 | 1/2012 | Ebanks |
| 2012/0078884 A1 | 3/2012 | Callari et al. |
| 2012/0084277 A1* | 4/2012 | Barve ............... G06F 17/30864 707/708 |
| 2012/0158715 A1 | 6/2012 | Maghoul et al. |
| 2012/0158720 A1 | 6/2012 | Luan et al. |
| 2012/0246578 A1 | 9/2012 | Baldwin et al. |
| 2012/0278740 A1 | 11/2012 | Robinson et al. |
| 2012/0296974 A1 | 11/2012 | Tabe |
| 2013/0036109 A1 | 2/2013 | Kulick et al. |
| 2013/0036114 A1 | 2/2013 | Wong et al. |
| 2013/0085844 A1 | 4/2013 | Neystadt et al. |
| 2013/0110825 A1* | 5/2013 | Henry ............... G06F 17/30864 707/723 |
| 2013/0246170 A1 | 9/2013 | Gross et al. |
| 2013/0275413 A1* | 10/2013 | Snir .................. G06F 17/30554 707/722 |
| 2013/0311458 A1* | 11/2013 | Goel .................. G06F 17/3053 707/723 |
| 2014/0095466 A1* | 4/2014 | Cumby et al. ............... 707/706 |
| 2014/0101134 A1* | 4/2014 | Bohrer et al. ............... 707/722 |

OTHER PUBLICATIONS

Connell, et al., "Introducing the New Bing: Spend Less Time Searching, More Time Doing", Retrieved at <<http://www.bing.com/community/site_blogs/b/search/archive/2012/05/10/spend-less-time-searching-more-time-doing-introducing-the-new-bing.aspx>>, May 10, 2012, pp. 3.

Levin, et al., "Bing Announces Social Updates to Search Results", Retrieved at <<http://blog.360i.com/search-marketing/bing-announces-social-updates-to-search-results>>, May 14, 2012, pp. 3.

Darrow, Barb., "Microsoft search guru outlines big Bing changes", Retrieved at <<http://gigaom.com/2012/05/10/microsoft-search-guru-outlines-big-bing-changes/>>, Jul. 11, 2012, pp. 5.

Johnson, Bridget., "The Socialized Search Take Over: Bing•s Social Sidebar Against Google•s Search Plus Your World", Retrieved at <<http://www.iprospect.com/blog/featured/the-socialized-search-take-over-bings-social-sidebar-against-googles-search-plus-your-world.html>>, Jul. 12, 2012, pp. 2.

"New Microsoft Bing design went live and blends great with Windows 8", Retrieved at <<http://pureinfotech.com/2012/06/01/new-microsoft-bing-design-windows-8/>>, Jul. 12, 2012, pp. 4.

Konstas, et al., "On Social Networks and Collaborative Recommendation", Retrieved at <<http://eprints.gla.ac.uk/5985/2/sigirfp468-konstas-ENLIGHTEN.pdf>>, SIGIR •09, Jul. 19, 2009, pp. 8.

* cited by examiner

MULTIDIMENSIONAL SEARCH ARCHITECTURE

BACKGROUND

As network communications among multiple computing devices have become ubiquitous, the quantity of information available via such network communications has increased exponentially. For example, the ubiquitous Internet and World Wide Web comprise information sourced by a vast array of entities throughout the world, including corporations, universities, individuals and the like. Such information is often marked, or "tagged", in such a manner that it can be found, identified and indexed by services known as "search engines". Even information that is not optimized for search engine indexing can still be located by services, associated with search engines, which seek out information available through network communications with other computing devices and enable a search engine to index such information for subsequent retrieval.

Due to the sheer volume of information available to computing devices through network communications with other computing devices, users increasingly turn to search engines to find the information they seek. Search engines typically enable users to search for any topic and receive, from this vast volume of information, identifications of specific content that is deemed to be responsive to, or associated with, the users' queries. To sort through the vast amounts of information that is available, and timely provide useful responses to users' queries, search engines employ a myriad of mechanisms to optimize the identification and retrieval of responsive and associated information.

Unfortunately, even with the aid of search engines, users are often overwhelmed by the sheer volume of information available. For example, typical topics searched for by users often result in millions of results that are identified by search engines. To cope with such information overload, empirical data suggests that users typically select one of the first ten results, as ordered by a search engine. If what the user is searching for is not among those first ten results, the user can become quickly frustrated with the search engine and can seek to utilize a different search engine. Consequently, the utility of a search engine to users can be in such a search engine's ability to guide the user to the content for which the user was searching as efficiently as possible.

SUMMARY

In one embodiment, search results received from a search engine, in response to a search query entered by the user, can comprise identifications of discrete sets of content, typically in the form of documents, identifications of entities and associated information and tasks, and identifications of individuals from whom additional information can be obtained. Such multidimensional search results can enable a user to more efficiently identify that for which they are searching, or more efficiently perform a task that is the basis for their search.

In another embodiment, a search engine can maintain an association or association between identified entities, which can be maintained in an entity database, and documents, such as webpages or other collections of information, which reference those entities, or are otherwise associated with those entities. Each entity in an entity database can be assigned a unique identifier and documents referencing such an entity, or otherwise associated with such an entity, can be marked with the identifier of that entity.

In yet another embodiment, existing algorithmic mechanisms can be utilized to identify documents that are responsive to a user's search query. Such identified documents can then be referenced to determine whether the user's search query is directed to one or more entities based upon whether such identified documents are marked with identifiers of one or more entities. The degree to which an entity is relevant to a user's search query can be based on the quantity of documents that were identified as responsive to the user's search query and which have been marked with an identifier of that entity, as well as the relative importance of each such document as among the other documents that were identified as being responsive to the user's search query.

In a further embodiment, people can be considered a specific type of entity and an identification of individual persons can be based on people-centric databases, such as those maintained by socially-directed network services, including well-known social networking services. People can be linked to specific types of queries based upon information associated with such people, including information authored by or about such people. A people/query mapping can be maintained and can be referenced to identify people relevant to a user's search query.

In a still further embodiment, a feedback loop can be employed to continuously refine and improve the people/query mapping. Such a feedback loop can be based on the differences between people initially identified as being relevant to a user search query, and people ultimately selected by the user.

In a yet further embodiment, user action directed to one dimension of search results can be utilized to generate updated, more specific queries that can then be utilized to generate updated search results in the same dimension, other dimensions, or combinations thereof.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
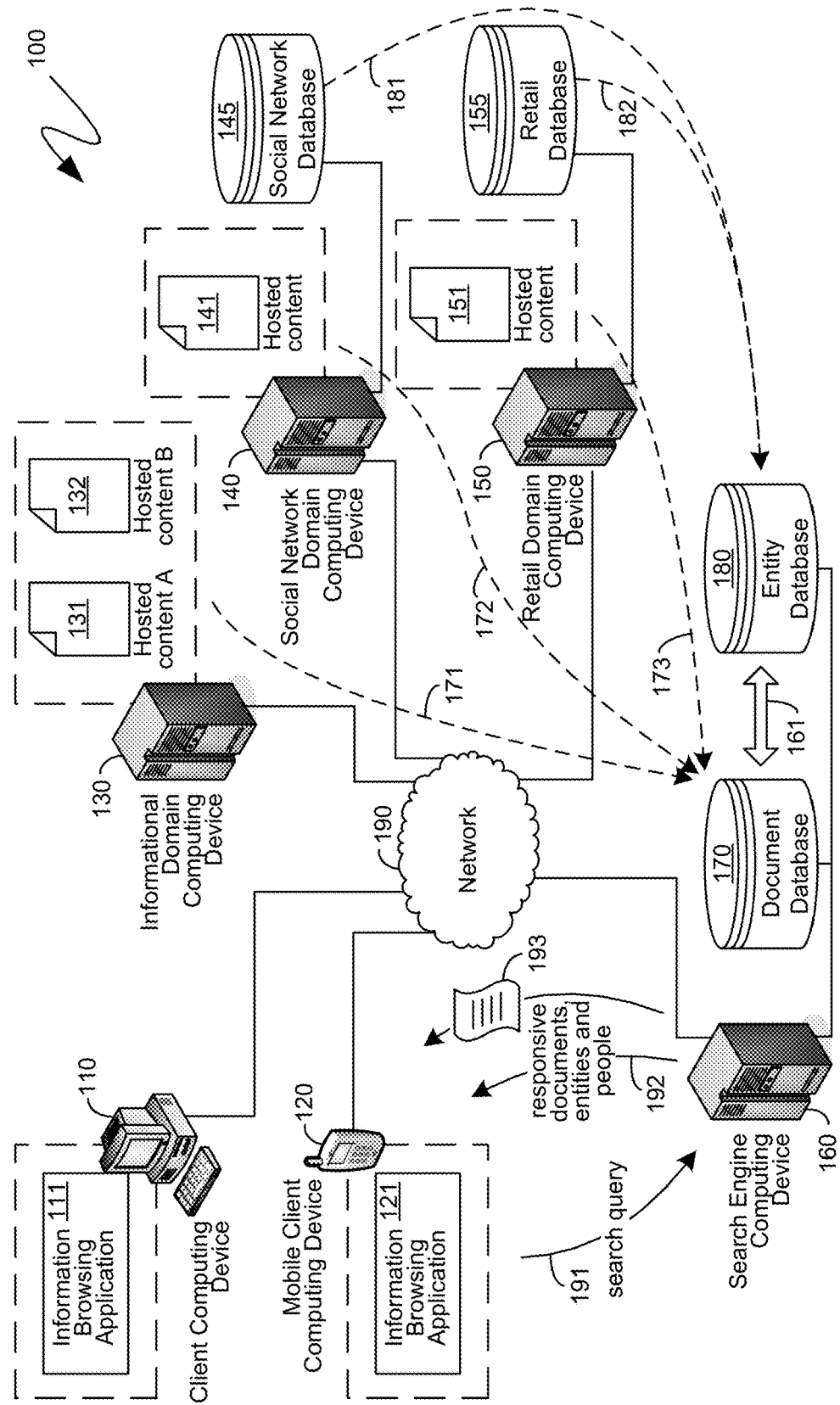
FIG. 1 is a block diagram of an exemplary network of computing devices exchanging communications for providing multidimensional search results.

The following descriptions are directed to the generation and provision of multidimensional search. Search results can include, not only content, typically in the form of documents, that is responsive to a user's search query, but can also include information regarding entities that are responsive to the search query, including tasks relevant to those entities, and can include identifications of individuals from whom additional information can be obtained, or who are otherwise relevant to the user's search. An association between entities and documents referencing those entities can be identified and maintained by marking documents with the identifiers of entities to which they are associated. Documents responsive to a user's search query can be identified utilizing existing algorithmic mechanisms. Such identified responsive documents can then be referenced to determine, based upon the identifiers of any entities with which such documents are marked, whether the user's search is directed to one or more entities. People can be a specific type of entity and information regarding people can be collected from socially-directed network services. A people/query mapping can be maintained associating individual people with specific queries, and associating queries with individual people, based upon information authored by, or about, such people. User actions directed to one or more people in response to a query can be utilized as a feedback loop to continuously improve the people/query mapping. Additionally, user actions directed to one dimension of search results can be utilized to generate updated search queries that can result in the provision of updated search results in the same dimension, in the other dimensions, or combinations thereof.

For purposes of illustration, the techniques described herein make reference to existing and known application user interface contexts, such as user interfaces typically presented by Web browsers. Also for purposes of illustration, the techniques described herein make reference to existing and known protocols and languages, such as the ubiquitous HyperText Transfer Protocol (HTTP) and the equally ubiquitous HyperText Markup Language (HTML). Such references, however, are strictly exemplary and are not intended to limit the mechanisms described to the specific examples provided. Indeed, the techniques described are applicable to any application user interface including, for example, lifestyle and/or entertainment applications, such as audio and/or video presentation applications and electronic book readers, and other content consuming and presentation applications.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, which provides context for the descriptions below. The exemplary system 100 of FIG. 1 is shown as comprising a traditional desktop client computing device 110, and a mobile client computing device 120 that are both communicationally coupled to a network 190. The network 190 also has, communicationally coupled to it, a search engine computing device 160 that can provide search functionality to users of client computing devices, such as the client computing device 110 or the mobile client computing device 120. The illustration of the search engine computing device 160 as a single device is strictly for illustrative simplicity, and the descriptions below are equally applicable to processes executing a single search engine computing device 160 or executing across multiple search engine computing devices, either in serial or in parallel.

The search engine computing device 160 can enable users of client computing devices to locate content accessible via the network 190. By way of example, an informational domain computing device 130, a social network domain computing device 140 and a retail domain computing device 150 are exemplarily shown as being communicationally coupled to the network 190 to provide context for the descriptions below. The informational domain computing device 130 can comprise hosted content 131 and 132. In one embodiment, the informational domain computing device 130 can be a traditional Web server computing device hosting one or more webpages, which typically provide informational content in the form of textual content, image content and other like hypermedia and multimedia content. The social network domain computing device 140 can comprise hosted content 141 that can be dynamically generated based upon information retrieved by the social network domain computing device 140 from the social network database 145 to which it is communicationally coupled. In one embodiment, the social network domain computing device 140 can be a computing device hosting a Web-based social network website through which users exchange textual messages, images, establish business connections, and perform other like social network functionality. In such an embodiment, the hosted content 141 can represent a dynamically generated webpage, such as a webpage on which users can post images or messages and have other users comment and leave feedback. The retail domain computing device 150 can comprise hosted content 151 that can be dynamically generated based upon information retrieved by the retail domain computing device 150 from the retail database 155 to which it is communicationally coupled. In one embodiment, the retail domain computing device 150 can be a computing device hosting a Web store or other like Web-based retail presence through which goods or services are sold. In such an embodiment, the hosted content 151 can represent a dynamically generated webpage, such as a webpage offering for sale a particular item and providing up-to-date information such as a current price of the item, whether or not the item is in stock, and other like information.

As will be recognized by those skilled in the art, in order to provide search functionality to users of client computing devices, the search engine computing device 160 can obtain information about the content available via the network 190, such as the content hosted by one or more of the computing devices 130, 140 and 150. For example, as illustrated by the arrows 171, 172 and 173, the search engine computing device 160 can be communicationally coupled to a document database 170 that can comprise information collected from the hosted content 131, 132, 141 and 151, respectively. Since such hosted content is typically divided into units, or "pages", of information, such as the ubiquitous webpage, the database 170 is referred to as a document database even though the information contained therein is not retained in page format, but rather is organized in matrices to enable efficient searching thereof.

In one embodiment, in addition to the document database 170, the search engine computing device 160 can have access to an entity database 180. Such an entity database can comprise information about "entities". An "entity", as utilized herein, means any thing about which there is discrete, objective information available, such as can be determined by reference to a search engine database. By way of example, and not limitation, entities include individuals, organizations, places, products, activities, websites, entertainment offerings, and the like. The entity database 180 can be generated utilizing a variety of mechanisms. For example, in one embodiment, the entity database 180 can be generated by referencing the document database 170, the information of which can be utilized to identify those things that can be classified as "entities" based upon the availability of discrete, objective information thereof. Such an identification of entities, and such generation of information about such entities, from the document database 170 is illustratively represented by the arrow 161. In another embodiment, the entity database can be generated by collecting information from other databases such as the social network database 145 or the retail database 155. For example, the social network database 145 likely already comprises information divided into "entities" in the form of individual people, including, for example, names, birthdays and contact information. As another example, the retail database 155 likely already comprises information divided into "entities" in the form of individual retail goods including, for example, the name of a retail item, a unique identifier thereof, a current price, and certain relevant features thereof. Such information can be collected directly from such databases and utilized to populate the entity database 180.

Both the client computing device 110 and the mobile client computing device 120 are shown as comprising information browsing applications 111 and 121 to illustrate that the mechanisms described below are equally applicable to mobile computing devices, including laptop computing devices, tablet computing devices, smartphone computing devices, and other like mobile computing devices, as well as to the ubiquitous desktop computing devices. For purposes of the descriptions below, references to the information browsing application 111 executing on the client computing device 110 are intended to be equally applicable to the information browsing application 121 executing on the mobile client computing device 120, and vice versa. In one embodiment, the information browsing application 111, or the information browsing application 121, can be the ubiquitous web browser that can retrieve and display information in the form of websites that are hosted by web servers communicationally coupled to the network 190, such as those described above. However, as indicated previously, the mechanisms described below are not limited to World Wide Web-based environments. Thus, for example, the information browsing applications 111 and 121, can be other types of information browsing applications including, for example, e-book readers, universal document format readers, or even content creation applications, such as word processors, spreadsheets, presentation applications, and e-mail applications. Yet another type of information browsing application can be an operating system itself, including, for example, operating systems comprising support for known networking protocols for the receipt and presentation of information and operating systems comprising information browsing components or built-in or included information browsing applications.

A user of the client computing device, such as the client computing device 110 or the mobile client computing device 120, can utilize the search functionality provided by the search engine computing device 160 by submitting a search query 191 to the search engine computing device 160. As will be recognized by those skilled in the art, such a search query can represent information, typically textual information, although it can include images, audio, and other like multimedia and hypermedia content, about which the user desires to obtain additional information from among the content available via the network 190. In response to the search query 191, in one embodiment, the search engine computing device 160 can provide "multidimensional search results". As utilized herein the term "multidimensional search results" means search results that provide different types of information in response to a search query. For example, one dimension of search results can be the well-known identification of documents, or other like hosted content, that comprise content deemed relevant to the search query. Such identification of documents is typically in the form of web links and such documents are typically in the form of webpages. Another dimension of search results can be an identification of entities that are relevant to the search query, including information about such entities, and tasks that can be associated with those entities such as, for example, reservation tasks that can be associated with hotel, restaurant, rental car, or other like entities, purchase tasks that can be associated with retail goods and services, and contact tasks that can be associated with individual people. Yet another dimension of search results can be an identification of people that are relevant to the search query, including information provided by such people via the network 190 such as, for example, textual information, images, blogs, or other like content authored by such people. In one embodiment, if a search query returns documents that are deemed to be responsive to such a query, then there can exist at least one person that can also be responsive to such a query, even if no entities are identified as being responsive to such a query.

The responsive documents, entities, people, and other like dimensions of search results can be provided in response to the search query, as illustrated by the communication 192. The descriptions below will be directed to the presentation of such multidimensional search results to a user of a client computing device such as, for example, client computing device 110 and the mobile client computer device 120. In addition, in one embodiment, a script 193, or other like collection of computer-executable instructions, can also be provided by the search engine computing device 160 to a client computing device in response to a search query received from such a client computing device. The script 193, as will be described in detail below, can collect information regarding user action directed to one dimension of search results to aid in the presentation of more relevant search results in one or more of the other dimensions. For example, as will be described in further detail below, the search query 191 can be ambiguous in that two or more different entities can be equally relevant to the search query. As one specific example, a search query "Chicago" may be directed to the city in the state of Illinois, to a Broadway musical, or to a film from the year 2002. One dimension of search results can identify, to the user, each of these entities, while another dimension of search results can identify those documents having the term "Chicago" in them, or which are otherwise deemed relevant. User action directed to a specific entity such as, for example, user action directed to the film entity, can disambiguate the user's search query. Consequently, the documents deemed responsive to the search can be updated to focus on documents directed to the film "Chicago". In such a manner, and as will be described in further detail below, user action directed to one-dimensional search results can increase the relevance of other dimensions of search results.

Figure 2:
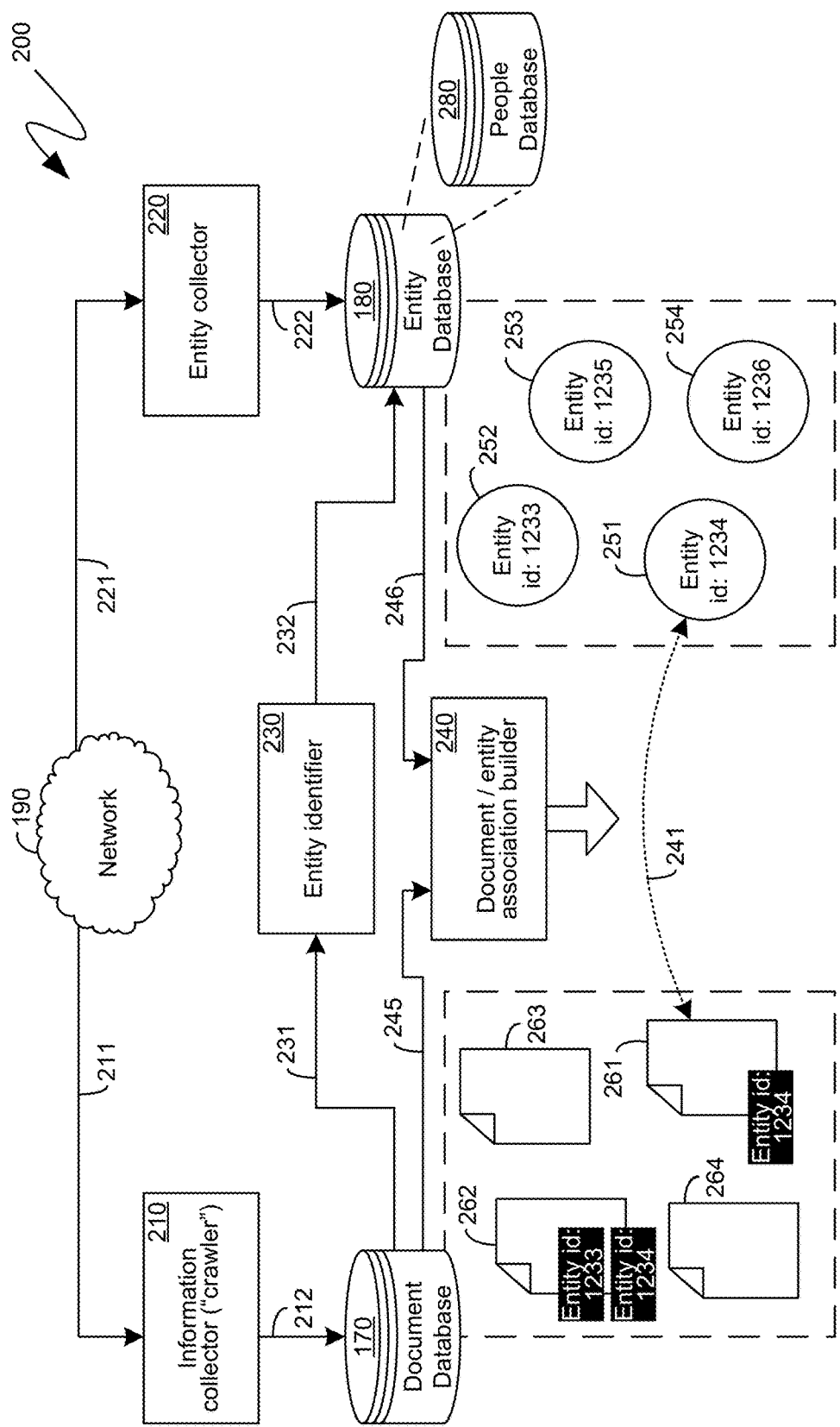
FIG. 2 is a block diagram of an exemplary association between documents and entities.

Turning to FIG. 2, an exemplary system 200 is shown therein illustrating an exemplary manner in which an association between one dimension of search results, namely entities, can be associated with another dimension of search results, namely documents or other like collections of information. Initially, and as will be recognized by those skilled in the art, an information collector 210, typically referred to as a "crawler" can obtain document information from the network 190, such as the network address at which a document is located, other meta-data about the document, and the informational content contained within the document. Such information can then be stored in a document database 170, typically in a manner to enable efficient searching of such information such as, for example, within one or more matrices or other like sets of data. The obtaining of such information from the network 190 by the information collector 210, and then its subsequent storing in the document database 170 is illustrated by the arrows 211 and 212, respectively.

In one embodiment, in addition to an information collector 210, an entity collector 220 can obtain entity information from the network 190. As indicated previously, an "entity" can be any thing about which there is discrete, objective information available. Consequently, in one embodiment, the entity collector 220 can obtain information that can identify entities, or which can provide additional information about entities that have already been identified.

One type of information that can be collected by the entity collector 220 can be structured information that is specifically designed to be consumed by, for example, the entity collector 220, and which can identify a specific entity or specific information about an entity. For example, a restaurant can advertise its services through one or more webpages. As part of such a restaurant effort to generate greater visibility on the ubiquitous World Wide Web, one or more of its webpages can include structured information that can identify the restaurant as an entity and provide specific entity information about such a restaurant entity such as, for example, the address and telephone number of such a restaurant, the hours of operation of such a restaurant, identification of the types of food offered by such a restaurant, the types of payments accepted by such a restaurant, and other like entity information.

Another type of information that can be collected by the entity collector 220 can be semi-structured information that conforms to a common structure, but may not necessarily be in a format easily consumed by the entity collector 220. For example, a retail merchant can offer a myriad of products for sale via the network 190 such that each product is presented within its own document, such as a webpage, but all such documents posted by the retail merchant can conform to a common structure. For example, each such document can comprise an image of the product, a name of the product, a price of the product, a unique identification number of the product, and reviews from other individuals who previously purchased that product from the retailer. Given such a common format, the entity collector 220 can recognize each document as identifying a specific entity, namely product entities, and can collect entity information based on such a common format. For example, the entity collector 220 can recognize the retailer's price for each a product because such a price is presented in the same format, within each product's page, across all of the products offered by such a retailer. The obtaining of such structured and semi-structured information from the network 190, by the entity collector 220, for purposes of identifying entities and obtaining information about those entities, is represented graphically in FIG. 2 by the arrow 221. The subsequent storing such information in an entity database 180 is then represented by the arrow 222.

In one embodiment, an entity database 180 can be maintained and can comprise entities, such as the entities 251, 252, 253 and 254, which can each have a unique entity identifier assigned to them. As indicated previously, such entities can include individual products, retail establishments, such as restaurants, shops, and the like, conceptual entities such as solar eclipses or tsunamis, and other like entities. In one embodiment, people can be a type of entity and, consequently, a portion of the entity database 180 can be conceptualized as a people database 280. Information about people can be collected by the entity collector 220, such as in the manner described in detail above. For example, various network-based social networking resources can comprise information about individual human users that can aid the entity collector 220 in identifying specific people, as entities, and obtaining entity information about those people. Such information can be structured, such as, for example, if the social networking resources provide application program interfaces that the entity collector 220 can utilize to access individual human users' information organized on a per-person basis, or such information can be semi-structured, such as, for example, if the social networking resources merely provide individual documents, such as webpages, where each such document represents information about a specific person.

In addition to information collected, such as by an entity collector 220, the entity database 180 can also comprise information retrieved from the document database 170. For example, an entity identifier 230 can reference the document database 170, as illustrated by the arrow 231 in the system 200 of FIG. 2, and can collect information from which can be used to populate the entity database 180 with additional entities, or to provide additional information to entities already existing in the entity database 180. Such an addition of information to the entity database 180, by the entity identifier 230, is illustrated the arrow 232 in FIG. 2. The entity identifier 230, in one embodiment, can search for specific types of information in the document database 170, such as addresses, telephone numbers, proper names, and other like information that is typically associated with entities. The entity identifier 230 can then determine whether such information is associated with a new entity, which does not yet exist in the entity database 180, or whether it is associated with an already existing entity. In the former case, the entity identifier 230 can create a new entity in the entity database 180 and can provide, to the entity database 180, the information it obtained about such an entity from the document database 170. In the latter case, the entity identifier 230 can add additional entity information to an already existing entity in the entity database 180.

An entity/document association builder 240 can then generate an association between entities of the entity database 180 and one or more of the documents of the document database 170 with which such entities are associated. For purposes of illustrative simplicity and description, the system 200 of FIG. 2 shows the document database 170 as comprising documents 261, 262, 263 and 264. As indicated previously, the document database 170 may not necessarily comprise such documents in a document-like form or structure, but rather may comprise the information from such documents organized in a manner, such as in a tabular or matrix format, which enables the document database 170 to be utilized by a search engine to quickly search for key terms or other like pieces of information as directed by a user's search query. Consequently, references below to documents stored in the document database 170, such as the documents 261, 262, 263 and 264, are meant to include references to identifiable sets of information obtained from a document, which the document database 170 may have stored in a different format for efficiency purposes.

In one embodiment, the entity/document association builder 240 can compare the entities of the entity database 180 to references to such entities in one or more of the documents of the document database 170. If a document in the document database 170 comprises a reference to an entity from the entity database 180, or if some other association exists between a document in the document database 170 and an entity in the entity database 180 that can be ascertained by the entity/document association builder 240, then the entity/document association builder 240 can establish an association between such an entity and such a document. In one embodiment, such an association can be in the form of a marking, or other metadata that can be associated with a document. Thus, for example, as shown in the system 200 of FIG. 2, the entity/document association builder 240 can obtain entity information from the entity database 180, as illustrated by the arrow 246, and document information from the document database 170, as illustrated by the arrow 245, and can, based upon such information, determine that, for example, the document 261 comprises a reference to the entity 251. The entity/document association builder 240 can, as a result of such a determination, generate an association 241 between the document 261, whose information is contained in the document database 170, and the entity 251, from the entity database 180. As another example, the document 261 can be otherwise associated with the entity 251 in a manner that the document/entity association builder 240 can determine, such as, for example, the document 261 can be hosted by a network domain that is registered to the entity. As indicated, in one embodiment, the association 241 can be implemented by marking the document 261 with the entity identifier of the entity 251, or by otherwise generating or modifying metadata of the document 261 to include the entity identifier of the entity 251. Such a marking of the document 261 with the entity identifier of the entity 251 is graphically illustrated by the system 200 of FIG. 2. In a similar manner, the entity/document association builder 240 can establish associations between other documents and other entities. In one embodiment, a document can reference, or otherwise be associated with, two or more entities and, consequently the document/entity association builder 240 can establish associations between that document and those two or more entities, such as by marking the document with multiple entity identifiers. Thus, for example, the document 262 is graphically illustrated as being associated with both the entity 251 and the entity 252, because such a document is shown as being marked with the entity identifiers of the entity 251 and the entity 252.

The association between documents and entities can be utilized to identify entities responsive to a user's search query. In particular, and as will be recognized by those skilled in the art, a substantial amount of effort has already been directed towards the generation and optimization of algorithms that identify documents responsive to a user's search query. In one embodiment, such existing algorithms, which can represent a substantial investment of time and money, can be utilized to aid in the identification of entities that are responsive to users search query by first utilizing such algorithms to identify documents responsive to a user's search query, and then identifying entities responsive to users search query based upon the entities known to be associated with the identified, responsive documents based upon, for example, the above described associations.

Figure 3:
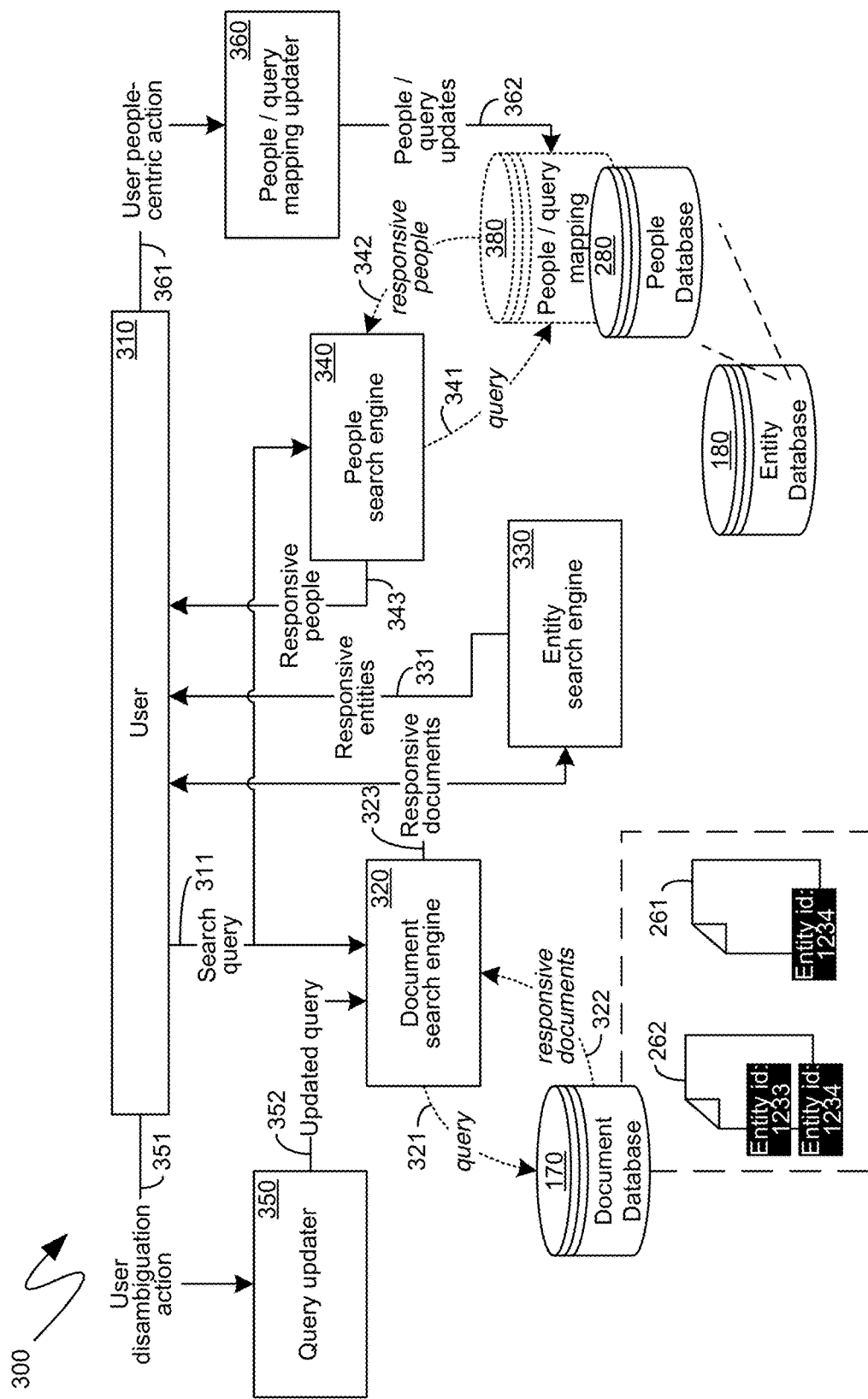
FIG. 3 is a block diagram of an exemplary provision of multidimensional search results.

Turning to FIG. 3, the system 300 shown therein illustrates an exemplary system by which a search engine can return multiple dimensions of search results in response to a user's search query. Initially, a user 310 can submit a search query 311 comprising information, such as search terms, images, or other like information, about which the user desires more information. In one embodiment, the user's search query 311 can be received by a search engine and can be directed to both a document search engine 320 and, independently, a people search engine 340. Although the document search engine 320 and the people search engine 340 are illustrated as separate components in the system 300 of FIG. 3, it is also contemplated that they can simply be different instances of equivalent, or analogous, computer executable instructions that can utilize known searching algorithms for identifying information responsive to a search query.

Upon receipt of the user's search query 311, the document search engine 320 can reference the above-described document database 170 to identify documents, whose information is in the document database 170, which are deemed to be responsive to the user's search query 311. Thus, as graphically illustrated by the system 300 of FIG. 3, the document search engine 320 references the document database 170 with the query 321 and identifies responsive documents 322 from the document database 170. The document search engine 320 then provides the responsive documents 323 to the user 310 as one dimension of search results.

In one embodiment, the document search engine 320 can also provide the responsive documents 323 to the entity search engine 330. The entity search engine 330 can then, based upon the documents identified as responsive documents 323, and whether or not such documents are associated with entities, such as by being marked with one or more identity identifiers, determine one or more responsive entities 331. More particularly, the entity search engine 330 can take into account the quantity of responsive documents 323 that are marked with the identifier of a particular entity, as well as how relevant those responsive documents 323 were deemed to be by the document search engine 320, to determine whether or not that particular entity is a responsive entity 331. For example, if the user's search query 311 results in the identification of millions of responsive documents 323 by the document search engine 320, then a single document, having a low relevancy score, found by the entity search engine 330 to be marked with an entity identifier is likely insufficient for the entity search engine 330 to conclude that such an entity is a responsive entity 331. By contrast, if nine of the ten most relevant documents, from among the responsive documents 323, are all marked with an entity identifier of a specific entity, the entity search engine 330 can conclude that such an entity is a responsive entity 331. In such a manner, the entity search engine 330 can utilize the responsive documents 323, identified using existing, and valuable, search algorithms by the document search engine 320, to identify the responsive entities 331 based upon which ones, and how many, of the responsive documents 323 were marked with entity identifiers of particular entities. The responsive entities 331 can then be returned to the user 310 as another dimension of search results.

In another embodiment, the user query 311 can be directed to the document search engine 320 and the entity search engine 330 in parallel. For readability such an embodiment is not specifically illustrated in FIG. 3. In such an embodiment, the entity search engine could respond to the user query 311 directly and return relevant entities, such as via the communication 331. More specifically, the entity search engine 330 could reference the entity database 180, independently, at least initially, of any documents identified by the document search engine 320. By referencing the entity database 180, and applying the relevant heuristic analysis, if appropriate, the entity search engine 330 could identify one or more of the responsive entities 331. The responsive entities 331 could then be provided to the user 310 independently of, for example, the responsive documents 323.

In yet another embodiment, the user query 311 could be directed to the document search engine 320 and the entity search engine 330 in parallel and independently of one another, but then the responsive documents 323 could be considered by the entity search engine 330, such as described in detail above, and, correspondingly, the responsive entities 331 could be considered by the document search engine 320. The responsive documents 323 provided to the user 310, and the responsive entities 331 provided to the user 310, can be a result of a mutual consideration of the responsive documents and responsive entities initially identified by the document search engine 320 and the entity search engine 330, respectively.

In a still other embodiment, the user query can be first directed to the entity search engine 330, and the entity search engine 330 can initially generate a set of responsive entities 331, such as in the manner described above. Subsequently, the responsive entities 331 can be provided to the document search engine 320 and can impact which documents, from among those whose information is stored in the document database 170, are considered, by the document search engine 320, to be the responsive documents 323. For example, if the entity search engine 330 were to identify a responsive entity 331 that was deemed to be highly relevant to the user's search query 311, the corresponding entity identifier of such an entity could be utilized by the document search engine 320 to promote the relevance scores of documents marked with such an identifier. The responsive documents 323 identified by the document search engine 320 can, thereby, be influenced by the responsive entities 331.

As indicated previously, in one embodiment, the user's search query 311 can, independently of the document search engine 320, also be directed to a people search engine 340. Such a people search engine 340 can reference a people/query mapping 380 to identify one or more responsive people that are deemed to comprise knowledge or information relevant to the user's search query 311. Although not specifically illustrated, the people search engine 340 can also utilize the document database 170 to further identify one or more responsive people, either by referencing the document database 170 itself, or by utilizing the document search engine 320 to search for specific individuals or people-specific content. Returning to the people/query mapping 380, such a mapping can comprise information associating specific individuals to specific queries or query concepts, or associating particular queries or queries impacting identified concepts to specific individuals, so that such individuals are deemed to possess either knowledge or information relevant to such queries or would otherwise be considered by a user as being relevant to or responsive to such a query. More colloquially, the people/query mapping 380 can be based on the concept that, for each query for which there exists responsive information, there can also exist at least one person having either knowledge or information relevant to such a query.

In one embodiment, the people identified by the search engine 340 can be categorized into one or more categories based upon their relationship to the user 310, or the user's search query 311. For example, one category of people that can be identified by the people search engine 340 can be people with whom the user 310 shares some specific human connection, which can, colloquially, be considered as "friends" of the user 310. As another example, another category of people that can be identified by the people search engine 340 can be people comprising in depth or unique knowledge, experiences or information, including unique knowledge, experience or information about particular topics, irrespective of their human connection to the user 310. Colloquially, such people can be considered as "experts" and their relevance can be, not necessarily to the user 310, but rather to the search query 311. Other categories of people can also be identified by the people search engine 340, such as, for example, celebrities or other well-known people, leaders, such as politicians, royalty, and other like figureheads, and other such categories of people.

In one embodiment, the people/query mapping 380 need not be an explicit database, but rather can represent information individually associated with people entities of the conceptual people database 280 which, as indicated previously, can be merely a defined, although not necessarily separately maintained, subset of the entity database 180. For example, the people/query mapping 380 can be implemented in the form of specific information, or metadata, assigned to people entities identifying one or more queries or query topics with which such people are associated. For example, a person who has published a book on a specific subject can be associated with queries impacting such a subject. In such an example, the entity representing such a person can be updated to include information, or metadata, identifying those queries such that, when such a query is subsequently received by the people search engine 340, such information can be referenced to identify that person as being responsive to that query. As another example, a person whose postings on a social networking website contain specific words or phrases can be associated with queries impacting subjects to which such specific words of phrases are related. Because such postings can continually change, the mappings of the people/query mapping 380 can be continually updated, even apart from the feedback mechanisms described in further detail below.

As graphically illustrated by the system 300 of FIG. 3, the users' search query 311 can be directed to the people search engine 340, which can then utilize the query 341 to reference the people/query mapping 380 to identify the responsive people 342. In other embodiments, the people search engine 340 can reference the people entities of the people database 280 and can utilize other mechanisms by which to search such a people database 280 and identify the responsive people 342. The responsive people 343, as determined by the people search engine 340, can then be returned to the user 310 as yet another dimension of search results.

In one embodiment, a people/query mapping updater 360 can receive information regarding user actions directed to one or more of the responsive documents 323, the responsive entities 331 and the responsive people 343 and can utilize such information to update the people/query mapping 380. More specifically, a user people-centric action 361 can identify, to the people/query mapping updater 360, which search result, if any, had user action directed to it, presumably as the search result that the user found most responsive to their search query 311. Such information can then be utilized by the people/query mapping updater 360 to generate the people/query updates 362, which can be applied to the people/query mapping 380. For example, if users searching for "string theory" often select a particular astrophysics expert, then the people/query updates 362 can cause the people/query mapping 380 to more strongly map the query "string theory" to the people entity that represents that particular astrophysics expert. Similarly, if users searching for "Chicago" rarely select the director of the musical "Chicago", then the people/query updates 362 can cause the people/query mapping 380 to less strongly map the query "Chicago" to the people entity that represents that director. While the above examples have been presented within the context of the user people-centric action 361 being a user action directed to one of the responsive people 343, the user people-centric action 361 can include user action directed to one or more search results from among the responsive documents 323, the responsive entities 331, or combinations thereof. For example, and returning to the above example of the search query 311 being the term "Chicago", if a user action was directed to documents regarding the city of Chicago, or if a user action was directed to the city of Chicago as an entity, then such action could be provided to the people/query mapping updater 360 as the user people-centric action 361 and the people/query mapping updater 360 could update the people/query mapping to, for example, prefer people entities associated with the city of Chicago. In such a case, the people/query mapping 380 could be updated to map the query "Chicago" more closely to the mayor of Chicago, as one of the people entities, than to the director of the musical "Chicago".

Because search results can be provided to the user 310 in multiple dimensions, such as one dimension comprising responsive documents 323, another dimension comprising responsive entities 331, and yet another dimension comprising responsive people 343, in one embodiment, user action directed to a specific responsive result in one dimension can impact the presentation of search results in that one dimension, in other dimensions, or in combinations thereof. In one exemplary embodiment, illustrated by the system 300 of FIG. 3, a user disambiguation action 351 can be received by a query updater 350, which can then generate an updated query 352 that can be provided to the document search engine 320 to generate an updated set of responsive documents 323. In other embodiments, not specifically illustrated in FIG. 3 to avoid clutter and illegibility, the updated query 352 can be initially provided to the document search engine 320, the entity search engine 330, the people search engine 340, or in parallel to any combinations thereof. Upon receiving the updated query 352, the one or more of the document search engine 320, the entity search engine 330 and the people search engine 340 can generate updated responsive documents 323, responsive entities 331 and responsive people 343, respectively. Thus, for example, if the user's search query 311 was for the term "Chicago" the entity search engine 330 could provide responsive entities 331 that include the city of Chicago, the film "Chicago" and the musical "Chicago". If the user 310 then selects the city of Chicago entity, such a selection can be received by the query updater 350, as the user disambiguation action 351, and the query updater 350 can generate an updated query 352 which can more strongly focus on the city of Chicago, enabling the document search engine 320 to generate an updated set of responsive documents 323 that are more closely associated with the city of Chicago, as opposed to, for example, the film "Chicago" or the musical "Chicago". The user's search query 311 can, in such an example, be considered to be "ambiguous" since it can equally be directed to two or more different entities or concepts. The user disambiguation action 351, or other user action directed to one search result in one dimension of search results, can be utilized to disambiguate such a query, thereby enabling the search results presented in that dimension, in other dimensions, or in combinations thereof to be updated in accordance with such a disambiguation. Thus, while the above example was presented within the context of a user action directed to an entity causing updated documents to be provided, the mechanisms described can be equally applied to any user action directed to any one dimension of search results causing updated search results to be presented in that dimension of search results, in one or more other dimensions of search results, or in combinations thereof.

In particular, and as indicated, user action directed to one dimension of search results can, in addition to updating other dimensions of search results, also result in the updating of search results in the same dimension as that to which the user action was directed. For example, if the user searched for a topic that could be further refined, such as "digital cameras", the entity search engine 330 could provide, as part of the responsive entities 331, not only specific digital camera entities, but also attribute selections to enable a user to narrow down their search to specific digital cameras based on digital camera attributes. For example, information regarding resolution ranges, price ranges, types of digital cameras and other like attributes could be presented to the user as part of the responsive entities 331. If a user were to select a specific attribute or attribute range, such a selection could, not only change the responsive documents 323 being presented to the user, but could also change the responsive entities 331 being presented to the user. For example, if a user were to select a price range of less than $200, such a user disambiguation action 351 could be communicated to the query updater 350 and the updated query 352 could be provided, not only to the document search engine 320 as illustrated, but also to the entity search engine 330. The entity search engine 330 could then determine that, for example, the resolution ranges should be updated. For example, while the entity search engine 330 can have initially presented resolution ranges of having upper boundaries in the 20-30 megapixel range, such ranges can be changed because the entity search engine 330 can determine, for example, that no digital cameras whose prices are less than $200 have resolutions above twelve megapixels. In such a manner, updates can be made to the responsive entities 331 as well as to, for example, the responsive documents 323, in response to the user disambiguation action 351.

The user disambiguation action 351, like the user people-centric action 361, can be communicated to the search engine by computer-executable instructions executing on whatever computing device is being utilized by the user 310 to submit the users search query 311. In one embodiment such computer-executable instructions can, initially, be provided by the search engine. For example, together with the multiple dimensions of search results, such as the responsive documents 323, the responsive entities 331 and the responsive people 343, the search engine can also provide, to the user's computing device, a script file or other like computer executable instructions that can execute on the user's computing device and can monitor user action directed to one or more dimensions of search results. In such a manner the search can receive information from the user that can be utilized to improve search results, including both search results being presented to the current user 310, and in subsequent search results that may be presented to subsequent users.

Figure 4:
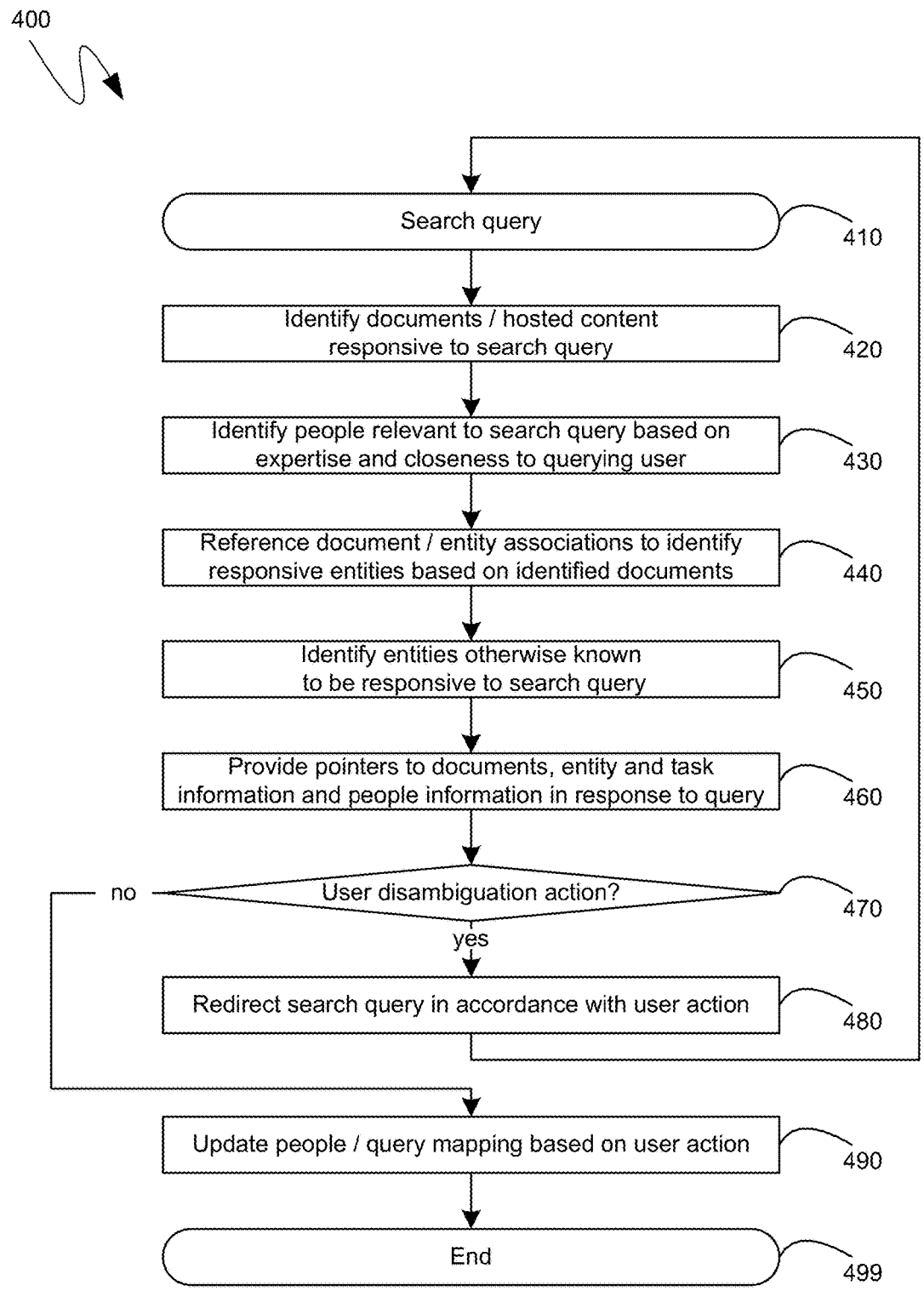
FIG. 4 is a flow diagram of an exemplary provision of multidimensional search results.

Turning to FIG. 4, the flow diagram 400 shown therein illustrates an exemplary series of steps that can be performed in order to provide multiple dimensions of search results in response to a user's search query. Initially, as illustrated by step 410 in FIG. 4, a search query can be received. Subsequently, at step 420, documents, such as webpages, or other like content hosted by computing devices and available via network communications can be searched and documents responsive to the search query can be identified. Similarly, at step 430, people relevant to a search query can also be identified. In one embodiment, people responsive to the search query received at step 410 can be identified, at step 430, based on their relationship to the querying user and based on their expertise, or body of knowledge possessed by such people. Thus, in such an embodiment, a person that is both connected to the querying user and comprises expertise in the topic for which the user has searched can be most highly ranked as being responsive to the user's search query, while an individual to whom the querying user has no connection, and who possesses no knowledge about the topic, can have the least relevance to the user's search query. In another embodiment, the identification of people at step 430 can be based on an association between content that was have been authored by such people and the search query received at step 410. For example, one group of people whose authored content can be searched can be people having a relationship to the querying user, such as that user's friends. As another example, another group of people whose authored content can be searched in the people having particular expertise, experience, or unique positions, such as celebrities, politicians, professors, and other like individuals. In such an embodiment, a person can be identified as being relevant to the search query if they have authored content that is deemed to be relevant to the search query. As will be recognized by those skilled in the art, while step 430 is illustrated as occurring after step 420, they can be executed in parallel and can be performed independently of one another.

Subsequently, at step 440, the documents identified at step 420 as being responsive to the user's search query can be referenced to determine whether one or more such documents are associated with one or more entities. Entities that are associated with a large number of documents, which are deemed to be highly relevant to the user's search query, can be identified as potentially responsive entities. While entities can be identified, utilizing the mechanisms described in detail above, based upon the documents identified at step 420, in another embodiment entities can also be identified based in the search query received at step 410. In particular, specific entities may be known to be responsive to specific queries or queries for specific kinds of information. As one example, if a query for a "digital camera" is received, entities that are known to represent digital cameras can be determined to be responsive to such a search query even if no documents comprising the term "digital camera" are associated with such digital camera entities. Consequently, in one embodiment, in addition to the identification of responsive entities at step 440, based on documents/entity associations and based on the documents identified in step 420, a subsequent step, namely step 450, can identify entities that are otherwise known to be responsive to the search query, irrespective of their association with the documents identified at step 420.

In another embodiment, as indicated previously, the search query received at step 410 can have been provided independently to an entity search engine and, in such an embodiment, the identification of responsive entities 440 can be based, at least initially, on the search query itself as opposed to any document/entity associations. Subsequent steps can then be performed in which the document/entity associations are referenced so as to improve the documents identified at step 420, the entities identified at step 440, or combinations thereof.

At step 460, then, the various dimensions of search results identified at steps 420, 430, 440 and 450 can be provided. As will be recognized by those skilled in the art, rather than providing the responsive documents directly, typically only pointers, such as links, to the responsive documents are provided at step 460. Additionally, although not specifically illustrated by the steps of FIG. 4, the provision of multiple dimensions of search results can include the provision of mechanisms by which such search results can be utilized to perform tasks. For example, and as indicated previously, specific entities can have specific tasks associated with them, such as tasks directed to making restaurant reservations or purchasing movie tickets, and mechanisms for performing such tasks can be provided as part of step 460. Similarly, people can have tasks associated with them, such as contact tasks through various forms of contact including, for example, electronic mail, instant messaging, and other like forms of contact. Thus, in one embodiment, step 460 can include the provision of task mechanisms by which the people, which were identified at step 430, can be contacted.

Subsequently, at step 470, a determination can be made as to whether the user has directed a user action to one or more of the responsive search results that were presented at step 460. If, at step 470, it is determined that the user has made such a user disambiguation action, then an updated search query can be generated at step 480 that can be more directed, or more focused, based upon the user action. For example, if the user disambiguation action 470 was directed to a specific entity, from among the multiple entities provided at step 460 as the responsive entities, then the updated search query generated at step 480 can be more focused on such an entity. Processing can then return to step 410 at which point such an updated query can be processed. The processing performed at step 470 can also encompass a determination of whether a user selected a particular range of attributes that can have been presented as part of the entity information deemed responsive to the search query, such as at step 450. For example, if the search query received at step 410 had been directed to "digital cameras", then as part of the identification of the digital camera entities at step 450, a determination of corresponding attributes can be made such that, at step 460, as part of the provision of entity information, information regarding various entity attributes can be provided such as, for example, various resolution ranges of the digital camera entities. If a user were to select a specific resolution range, such a user action can be deemed a user disambiguation action, as that term is utilized at step 470, and an updated search query can be generated at step 480 that can update, not only the documents that will be identified as step 420 is performed a subsequent time, but also the digital camera entities, and, correspondingly, the resolution ranges, they can be part of the entity information identified at the 450 and presented at step 460, as those steps are performed a subsequent time.

If, however, at step 470, it is determined that there is no user disambiguation action, processing can proceed to step 490 at which point an update to the people/query mapping can be performed, utilizing any user action as feedback to adjust the people/query mapping accordingly. The relevant processing can then end at step 499. In one embodiment, any user action can potentially provide information that can be utilized to update the people/query mapping. Such user action can include user action directed specifically to the people identified at step 430 and provided at step 460, but it need not be so limited. For example, as indicated previously, the lack of a user selection, or user action directed to other dimensions of search results, can be perceived as an explicit user action indicating that the people identified, at step 430, as being responsive to the search query of step 410 were not, in fact, responsive and a corresponding update to the people/query mapping can be performed at step 490.

Figure 5:
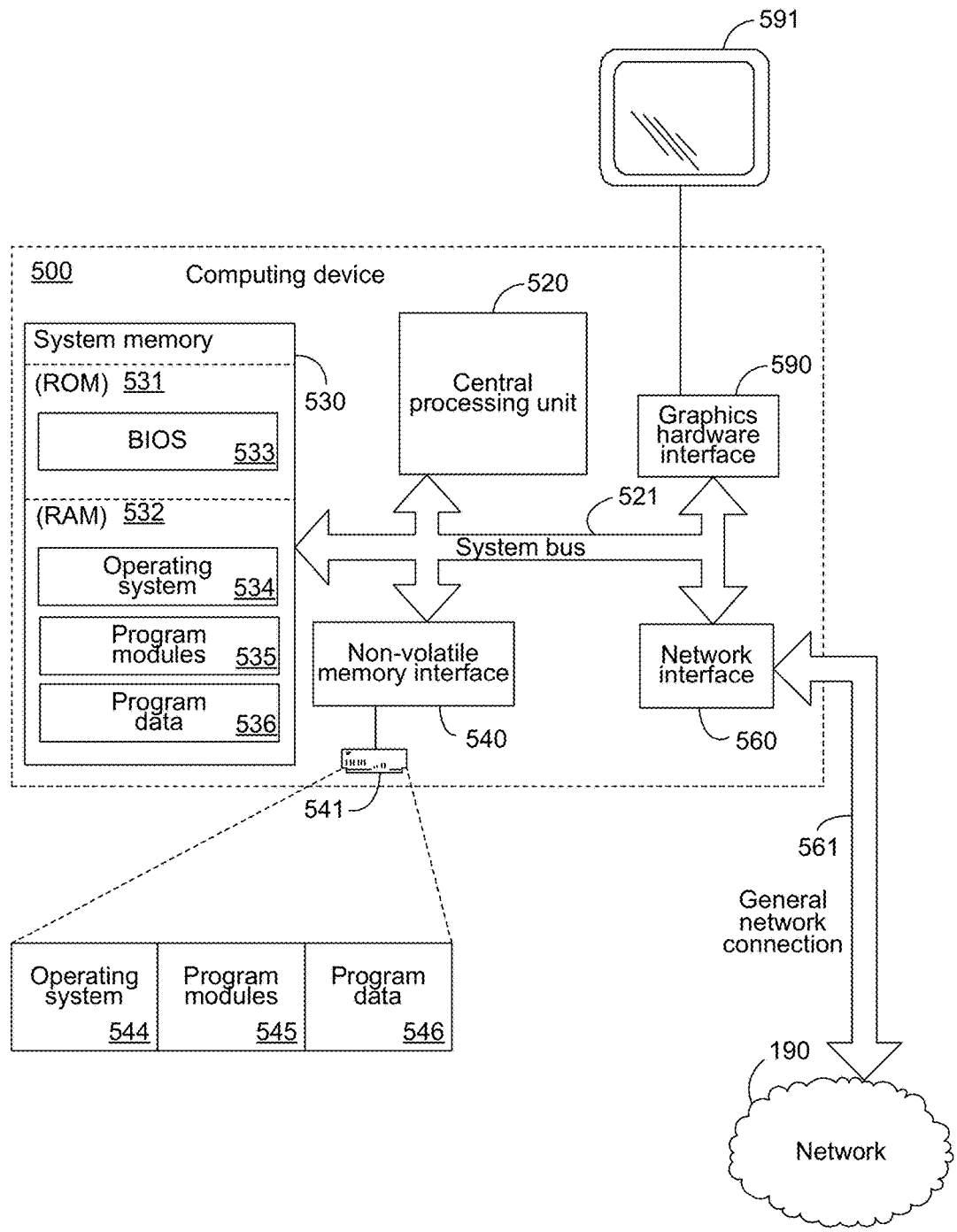
FIG. 5 is a block diagram of an exemplary computing device.

Turning to FIG. 5, an exemplary computing device 500 is illustrated. The exemplary computing device 500 can be any one or more of the computing devices referenced in FIG. 1, whose operations were described in detail above. The exemplary computing device 500 of FIG. 5 can include, but is not limited to, one or more central processing units (CPUs) 520, a system memory 530, that can include RAM 532, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, such as for the display of visual user interfaces, including, but not limited to, a graphics hardware interface 590 and a display device 591, which can include display devices capable of receiving touch-based user input, such as a touch-sensitive, or multi-touch capable, display device. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and the aforementioned RAM 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates the operating system 534 along with other program modules 535, and program data 536.

The computing device 500 may also include other removable/non-removable, volatile/nonvolatile computer storage media. By way of example only, FIG. 5 illustrates the hard disk drive 541 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 can operate in a networked environment using logical connections to one or more remote computers. The computing device 500 is illustrated as being connected to the general network connection 561 through a network interface or adapter 560 which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 561. It will be appreciated that the network connections shown are exemplary and other means of establishing a communications link between computing devices may be used.

As can be seen from the above descriptions, mechanisms for providing multiple dimensions of search results in response to a search query have been enumerated. In view of the many possible variations of the subject matter described herein, we claim as our invention all such embodiments as may come within the scope of the following claims and equivalents thereto.

We claim:

1. One or more computer-readable storage media comprising computer-executable instructions for providing multidimensional search results in response to a search query, the computer-executable instructions directed to steps comprising:

identifying responsive documents relevant to the search query;

identifying one or more responsive entities, relevant to the search query, based upon at least some of the responsive documents and entity identifiers with which the at least some of the responsive documents are marked;

identifying responsive people relevant to the search query; and generating, in response to the search query, a first dimension of search results comprising identification of at least some of the responsive documents, a second dimension of search results comprising identification of at least some of the responsive entities, and a third dimension of search results comprising identification of at least some of the responsive people.

2. The computer-readable storage media of claim 1, wherein the computer-executable instructions for identifying the responsive people comprise computer-executable instructions for referencing a people/query mapping database comprising mappings between individual people, represented in the people/query mapping database by people entities, and one or more queries associated with those individual people.

3. One or more computer-readable storage media comprising computer-executable instructions for generating search results identifying responsive people relevant to a search query, the computer-executable instructions directed to steps comprising:

receiving the search query;

identifying the responsive people relevant to the search query based on a people/query mapping, the people/query mapping comprising mappings between individual people, represented in people/query mapping database by people entities, and one or more queries to which such people are relevant; and generating, in response to the search query, search results comprising identification of at least some of the responsive people.

4. The computer-readable storage media of claim 3, wherein the computer-executable instructions for identifying the responsive people comprise computer-executable instructions for identifying one or people sharing a human connection with a user from whom the search query is received; and wherein further the computer-executable instructions for generating the search results comprise computer-executable instructions for listing, as friends, the responsive people identified as sharing the human connection with the user.

5. The computer-readable storage media of claim 3, wherein the computer-executable instructions for generating the search results comprise computer-executable instructions for separately listing, as experts, at least some of the responsive people.

\* \* \* \* \*